INVENTOR.
Walter J. Schrenk

INVENTOR.
Walter J. Schrenk
BY
AGENT

United States Patent Office 3,589,958
Patented June 29, 1971

3,589,958
METHOD FOR THE PREPARATION OF FILAMENT REINFORCED SHEET
Walter J. Schrenk, Bay City, Mich., assignor to The Dow Chemical Company, Midland, Mich.
Filed May 1, 1969, Ser. No. 820,876
Int. Cl. B29d 7/02
U.S. Cl. 156—74                                      5 Claims

ABSTRACT OF THE DISCLOSURE

Filament reinforced plastic sheet of laminar construction is prepared by extruding a tube by the trapped bubble process, centrifugally depositing a filamentary reinforcing material on the inner heat plastified surface of the bubble as it is extruded, collapsing the bubble and sealing opposed surfaces together, thereby entrapping the filamentary reinforcing.

---

This invention relates to a method for forming filament reinforced plastic sheet, and more specifically relates to the preparation of filament reinforced plastic sheet by tube extrusion.

For many purposes, synthetic resinous sheets are reinforced with synthetic reinforcing such as glass fiber or filament, natural fibers such as cotton, wool, or synthetic fibers or filaments such as nylon, polypropylene, cellulose acetate and the like. Filament reinforced sheets are prepared by the hot lamination of at least two sheets employing a filament reinforcing such as an open weave fabric; that is, a fabric having a plurality of open spaces regularly disposed therein. Such a lamination is accomplished often between heated rolls, or alternately, by supporting one plastic web, depositing the fabric or filamentary reinforcing on the surface of the web and extrusion coating a second layer thereon.

It would be desirable if there were available an improved method for the preparation of filamentary reinforcing wherein roving or chopped roving could be directly provided to form a laminate.

It would also be desirable if there were an improved method for the preparation of synthetic resinous filamentary reinforced sheets wherein the pattern of the reinforcing elements could be varied.

It would also be desirable if there were available an improved method for the direct preparation of filament reinforced synthetic resinous sheet from synthetic resin and a yarn of filamentary roving material.

These benefits and other advantages in accordance with the present invention are achieved in a method for the preparation of a filament reinforced synthetic resinous sheet wherein a filamentary reinforcing is disposed generally centrally within a sheet, the steps of the method comprising heat plastifying a synthetic resinous material, extruding the synthetic resinous material in the form of a tube, centrifugally depositing a filamentary reinforcing on the inner surface of the tube, collapsing the tube to form a flattened tube and adhering opposed surfaces of the tube to each other, thereby entrapping the filamentary reinforcing.

Further features and advantages of the present invention will become more apparent from the following specification taken in connection with the drawing wherein.

Figure 1:
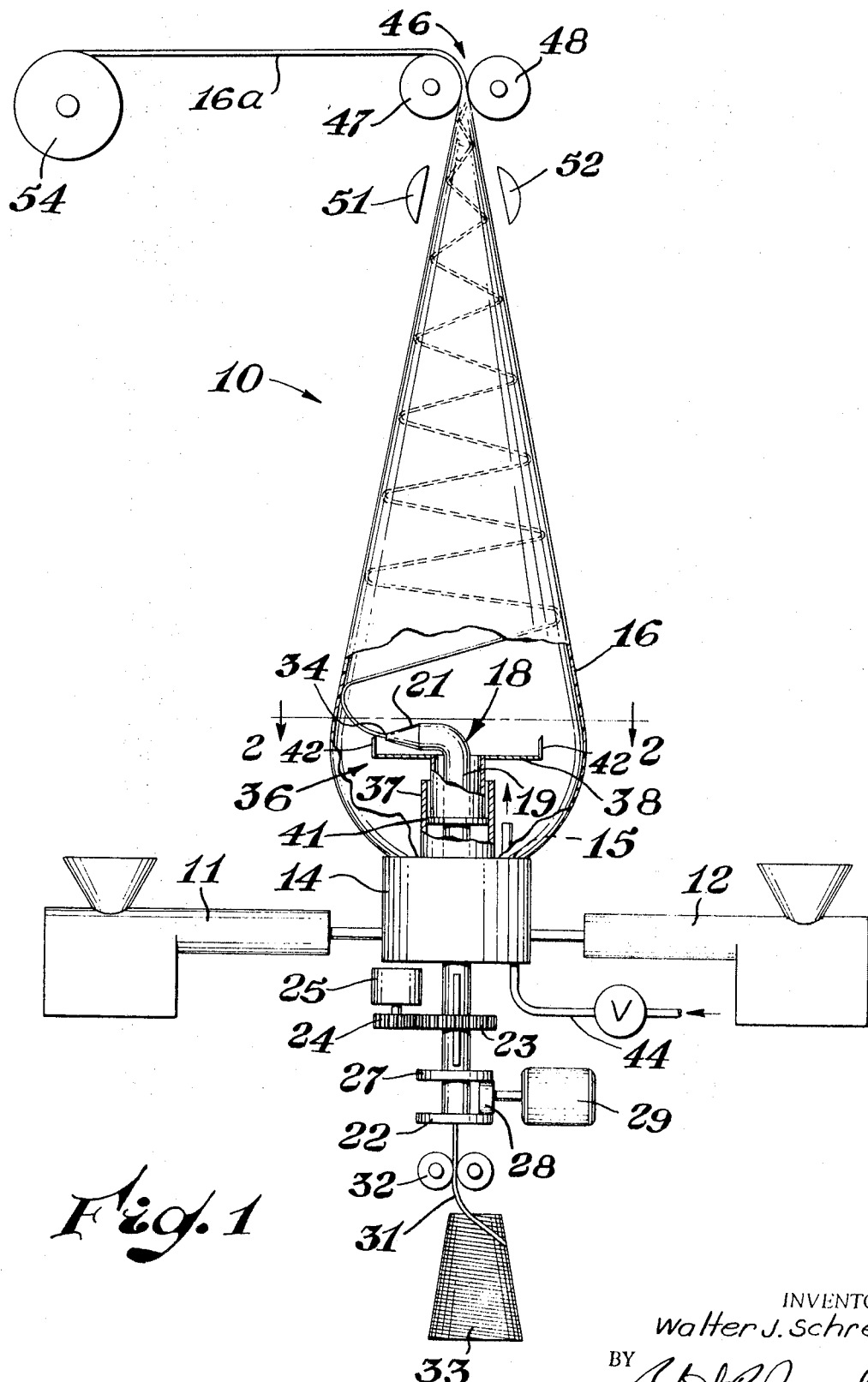
FIG. 1 is a schematic representation of an apparatus capable of performing the method of the present invention.

In FIG. 1 there is schematically depicted an apparatus capable of performing the method of the present invention generally designated by the reference numeral 10. The apparatus 10 comprises in cooperative combination a first source of heat plastified synthetic resinous thermoplastic material, or first extruder 11, a second source of heat plastified synthetic resinous material, or second extruder 12, and an annular die 14. The die 14 is adapted to extrude a tube comprising an inner layer of a first synthetic resinous material and an outer layer of a second synthetic resinous material. Such dies are well known in the extrusion art; see, for example, my earlier U.S. Pat. 3,308,508. The die 14 has an annular extrusion orifice 15 from which is extruded a tube 16. In operative association with the die 14 is a reinforcement dispensing means 18. The dispensing means 18 passes through the die 14 and is generally concentric with the annular orifice 15. The dispenser 18 has a generally hollow tubular body 19 rotatably and slidably journaled within the die 14. The body 19 has a discharge end 21 and an inlet end 22. The discharge end 22 is disposed within the tubular body 16 issuing from the die opening 15. A drive gear 23 is slidably keyed to the body 19. The drive gear 23 is in operative communication with a pinion gear 24 driven by a motor 25. The motor 25 and the gears 23 and 24 impart a rotary motion to the body 19. The body 19 has rigidly affixed thereto a cam follower 27. The cam follower 27 is in operative communication with a cam 28 supported on a motor 29. Rotation of the cam 28 causes the body 19 to reciprocate within the die 14. A strand or yarn of reinforcing material 31 is passed to the inlet end 2. of the body 19 by a pair of nip rolls 32 which serve to draw the yarn from a source 33. The yarn is discharged from a discharge opening 34 and the discharge end 21 of the body 19. A cutter assembly 36 is disposed in operative combination with the body 19. The cutter assembly 36 comprises a sleeve or bearing 37 affixed to the die and generally concentric with the annular die opening 15. A cutter support 38 is keyed into and slidably supported by the sleeve 37. The support 38 is in operative engagement with a collar or flange 41 affixed to the body 19. A plurality of cutting means or blades 42 are carried on the support 38 and adapted to optionally sever a strand issuing from the discharge opening 34. A gas supply 44 passes through the die 14 and permits the addition of a desired quantity of gas within the tube. A flattening means 46 is remotely disposed from the die 14 and is adapted to receive a tube such as the tube 16 issuing from the die opening 15 and press adjacent portions of the inner surface together. The flattening means 46 comprises a first nip roll 47 and a second nip roll 48, the nip rolls 47 and 48 being driven by means not shown. Between the flattening means 46 and the die 14 are disposed a pair of opposed heaters 51 and 52 adapted to heat a partially flattened portion of the tube 16 as it enters the flattening means 46. Beneficially, the heaters 51 and 52 are radiant heaters. A filament reinforced laminate 16a passes from the flattening means 46 and is wound onto a roll 54.

Figure 2:
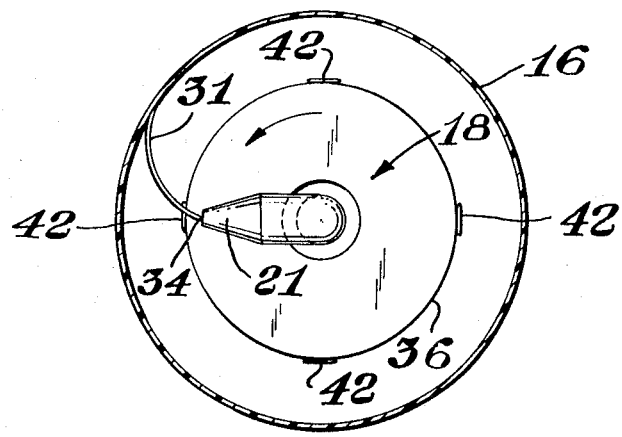
FIG. 2 is a schematic representation of the centrifugal filament dispenser employed in FIG. 1.

FIG. 2 is a schematic view taken along the line 2—2 of FIG. 1 showing the relationship between the bubble or tube 16, the dispensing means 18 and showing the arrangement of the blade 42 relative to the yarn or filament 31 issuing from the discharge opening 34 of the discharge end 21 of the body 19.

In FIGS. 1 and 2, for ease of illustration and clarity, the strand 31 is shown as continuous rather than as a plurality of short lengths which result from the operation of the blades 42 on the filament 31 after discharge from the opening 34.

In operation of the apparatus depicted in FIG. 1, beneficially, first and second synthetic resinous materials are provided by the extruders 11 and 12 to the die 14. Advantageously, the material forming the inner surface of the tube becomes thermoplastic at a lower temperature than the material forming the outer surface of the tube. For example, the outer surface of the tube may be formed of polypropylene and the inner surface of the tube from a copolymer of about 92 percent ethylene and 8 percent vinyl acetate. Initially, the tube is extruded, inflated, passed to the collapsing means and the heaters 51 and 52, if necessary, are adjusted to provide sufficient heat that the opposed inner surface of the tube heat seals to itself when passed through the nip of the rolls 47 and 48 to form a solid laminate such as the laminate 16a. A roving or filamentary reinforcing material such as the material 31 is disposed within the body 19. The distributor 18 is rotated at a desired rate of speed to obtain deposition of the filamentary reinforcing on the inner surface of the extruder tube. Advantageously, the cutters or blades 42 sever the reinforcing filament into desired lengths. The pattern of deposition can be varied by causing the cam or oscillating means 28 to rotate at a suitable speed by means of the motor 29 thereby imparting a reciprocating motion to the discharge opening 34 generally along the axis of extrusion. The disposition of the filamentary reinforcing on the inner surface of the tube can be varied within wide limits by varying the speed of rotation of the distributor 18 and oscillation of the distributor by the speed of the motor 29 as well as varying the shape of the cam 28. Oftentimes in start-up it may be desirable to initially adhere the roving to the inner surface of the tube if a continuous filament is desired. Adherence of the roving to the inner surface of the initially extruded tube prior to inflation assures a convenient discharge of the reinforcing roving or filament from the distributor.

Figure 3:
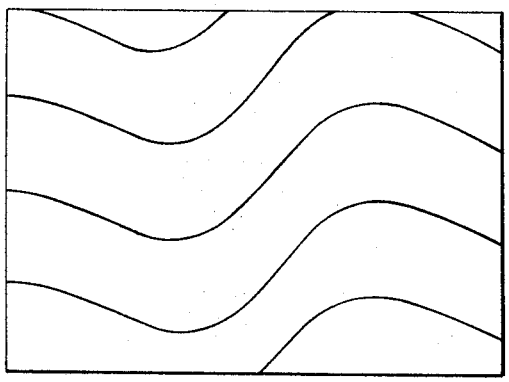
FIG. 3 depicts a pattern of filamentary reinforcing deposited on the inner surface of a tube employing the apparatus of FIG. 1.

FIG. 3 schematically depicts the arrangement of filaments on a portion of a tube wall employing the apparatus of FIG. 1 wherein a sinusoidal motion is applied to the distributor, the sinusoidal motion being of a substantially higher rate than the rate of rotation of the distributor.

Figure 4:
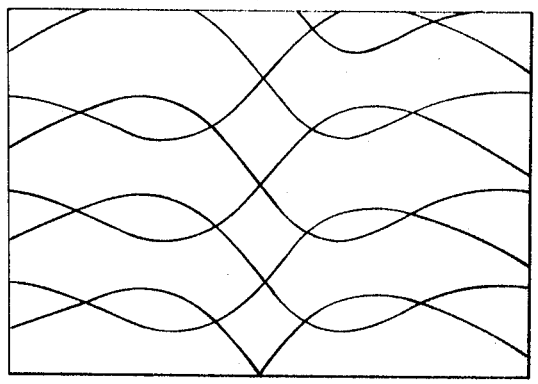
FIG. 4 depicts the pattern of filamentary reinforcing obtained on the collapse of tubes having the pattern of FIG. 3.

FIG. 4 depicts the pattern obtained in a portion of the flattened tube after passing through the nip rolls 47 and 48.

Patterns of the deposition of roving on the inner surface of the tube are almost infinite, depending upon the configuration of the cam employed. As depicted in FIG. 1, the cam is circular and provides sinusoidal reciprocating motion to the distributor. However modification of the cam arrangement employing a pin as a cam follower and a suitable groove cut in a disc attached to the motor permits a wide variety of linear motions. Other reciprocating means, of course, may be employed including programmed linear actuators such as a hydraulic cylinder driven by a variable speed pump, a linear electrically operated actuator which is readily programmed to travel at varying speeds by applying predetermined power to the motor of the actuator. For rapid transverse, a double action pneumatic or hydraulic cylinder may be employed which reverses on completion of a predetermined stroke. If desired, by eliminating any oscillatory motion of the distributor, reinforcing material may be deposited in a generally helical pattern, the pitch of the helix being dependent upon the relative rotary motion of the distributor and the speed of the bubble 16. If desired, discontinuous reinforcing is readily applied by employing the cutter blade such as the blades 42 which serve to sever the strand such as the strand 31 issuing from the distributor. The length of such strands will depend on the relative rate of feed of the reinforcement, the speed of rotation of the distributor and the angular placement of the blades about the distributor. If discontinuous filaments of maximum length are desired, a single blade such as the blade 42 is employed. If shorter lengths are more desirable for the particular reinforced sheet being prepared, blades are added generally adjacent the periphery of the cutter assembly 36. If it is desired that the reinforcing filaments be of generally equal length, the cutters are disposed in generally radial equiangular disposition about the axis of rotation of the body 19. If varying lengths of reinforcing material are desired, the angle between the blades may be varied accordingly. The length of the fibers will be generally proportional to the angular operation between the cutters or cutting blades. Conveniently, the cutting assembly 36 may be rendered inoperative by removing the blade and permitting the deposition of a continuous filament.

The practice of the present invention is not restricted to any specific synthetic resinous materials and is operable with any synthetic resinous material that can be extruded by the trapped bubble process. Typical materials include polystyrene, polyvinyl chloride, polyamides such as nylon 6, nylon 66 and the like, extrudable polyurethanes, polyethylene, polypropylene, resinous copolymers of ethylene and propylene and the like.

In the method of the invention depicted employing the apparatus of FIG. 1 wherein first and second synthetic resinous materials are employed primarily with the intension of using the inner material essentially as a hot melt adhesive, temperature control of the extruded tube is considerably less critical than when a single resinous material is employed. If a single resinous material is employed such as polyethylene, generally it is necessary to maintain the inner surface of the bubble at a temperature sufficiently high that the filamentary reinforcing material will adhere thereto while maintaining the exterior surface of the tube at a lower temperature wherein sufficient strength is imparted at least to the outer surface of the extruded tube to maintain the integrity of the bubble. Advantageously, this frequently is accomplished, if natural draft cooling is inadequate, by employing an external cooling means such as air; that is, a source of inwardly flowing cooling gas directed at the exterior surface of the bubble generally adjacent the die, maintaining an extruded tube at a sufficient thickness that the inner surface will remain tacky. Such techniques are well known in the extrusion art and need not be discussed further. For most purposes, it is desirable to employ a relatively rigid material for the external surface of the tube. Such a rigid material may be nylon, polystyrene, polypropylene, polycarbonate or the like and employ a relatively soft adhering polymer on the inner surface thereof such as polyethylene, plasticized polyvinyl chloride, copolymers of vinyl acetate and vinyl chloride and the like. A multitude of such simultaneously extrudable combinations are known and many are commercially available as simultaneously extruded film or sheeting.

By way of further illustration, employing an apparatus substantially as depicted in FIG. 1 wherein a die having an annular opening 14 inches in diameter is employed, polypropylene is extruded at a temperature of 240° C. to form the outer layer of the extruded tube and a copolymer of about 85 parts by weight ethylene and 15 parts by weight vinyl acetate is extruded at a temperature of about 200° C. to form the inner layer of the tube. Nylon roving is introduced through the distributor which is rotated at a speed of about 100 revolutions per minute and the distributor is not caused to reciprocate within the die. Fourteen cutter blades are employed spaced equidistant about the periphery of the cutter assembly. The nylon roving is severed into relatively short lengths and is randomly distributed on the inner surface of the tube which is inflated to a maximum diameter of 22 inches and subsequently with the application of infrared heat and passed between the nip rolls to provide a tough nylon filament reinforced sheet having a thickness of about 12 mils.

When the foregoing procedure is repeated with the exception that the distributor is caused to oscillate a distance of 3 inches at a rate of about 200 cycles per minute, the filaments appear to be even more randomly distributed than in the foregoing illustration. Removal of the cutter blades and oscillation of the distributor causes the filament to be deposited in a serpentine manner on the inner surface of the bubble with overlapping of the continuous nylon roving. When oscillation of the distributor is stopped, a generally uniform helical pattern is obtained. In order that a relatively flat and wrinkle free sheet is prepared, the expansion of the tube, if the tube is expanded, is necessary prior to the application of the filamentary reinforcing, as expansion of the tube after application of the reinforcing oftentimes causes either pucker or a portion of the reinforcing to separate from the inner surface of the extruded tube.

Similar beneficial results are obtained when a styrene polymer containing 6 weight percent rubber polymerized therein is employed as the outer layer and a polymer of 62 weight percent styrene and 38 weight percent butadiene is employed as the inner layer. Other outer layer-inner layer combinations which are found satisfactory are nylon-polyethylene, polyvinyl chloride-vinyl chloride-vinyl acetate copolymers, polycarbonate-ethylene acrylic acid copolymers, as well as other hereinbefore disclosed combinations.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A method for the preparation of a filament reinforced synthetic resinous sheet wherein a filamentary reinforcing is disposed generally centrally within the sheet, the steps of the method comprising
heat plastifying a synthetic resinous material,
extruding the synthetic resinous material in the form of a tube,
centrifugally depositing a filamentary reinforcing on the inner surface of the tube,
collapsing the tube to form a flattened tube, and
adhering opposed surfaces of the tube to each other thereby entrapping the filamentary reinforcing.

2. The method of claim 1 wherein the step of extruding includes delivering a first plastic material from a first extruder and a second plastic material from a second extruder and extruding a two-layer tubular film with the first synthetic resinous material being disposed on the inner surface of the tube and the first synthetic resinous material heat plastified at a lower temperature than the second synthetic resinous material.

3. The method claim 1 including the step of oscillating the filamentary reinforcing material within the tube along a direction generally parallel to the axis of extrusion prior to deposition of the reinforcing on the inner surface of the tube.

4. The method of claim 1 including the step of heating the tube immediately prior to flattening to a temperature sufficient to heat plastify the inner surface thereof.

5. A method for the preparation of a filament reinforced synthetic resinous sheet wherein a filamentary reinforcing is disposed generally centrally within the sheet, the steps of the method comprising
heat plastifying a synthetic resinous material,
extruding the synthetic resinous material in the form of a tube,
depositing a reinforcing material on the inner surface of the tube by centrifugally dispensing a filamentary reinforcing material and severing said filamentary material within the tube prior to deposition on the inner surface of the tube,
collapsing the tube to form a flattened tube, and
adhering opposed surfaces of the tube to each other thereby entrapping the filamentary reinforcing.

References Cited

UNITED STATES PATENTS

| | | | |
|---|---|---|---|
| 1,933,019 | 10/1933 | Laubi | 264—174X |
| 2,668,323 | 2/1954 | Johnson | 264—95X |
| 2,763,029 | 9/1956 | Julloss, Jr. | 264—95 |
| 3,065,097 | 11/1962 | Zupic et al. | 18—14UX |
| 3,090,998 | 5/1963 | Heisterkamp et al. | 264—95 |
| 3,150,219 | 9/1964 | Schmidt | 264—311X |
| 3,436,442 | 4/1969 | Saks | 264—95X |
| 3,467,565 | 9/1969 | Utz | 156—244 |
| 3,487,149 | 12/1969 | Bunish et al. | 264—174 |

FOREIGN PATENTS

| | | | |
|---|---|---|---|
| 989,323 | 4/1965 | Great Britain | 264—95 |
| 1,052,884 | 12/1966 | Great Britain | 264—95 |
| 1,098,381 | 1/1964 | Great Britain | 156—244 |
| 37/7,627 | 9/1962 | Japan | 156—244 |
| 37/13,338 | 7/1962 | Japan | 156—244 |

ROBERT F. WHITE, Primary Examiner

T. J. CARVIS, Assistant Examiner

U.S. Cl. X.R.

156—169, 244; 264—95, 114, 171